UNITED STATES PATENT OFFICE.

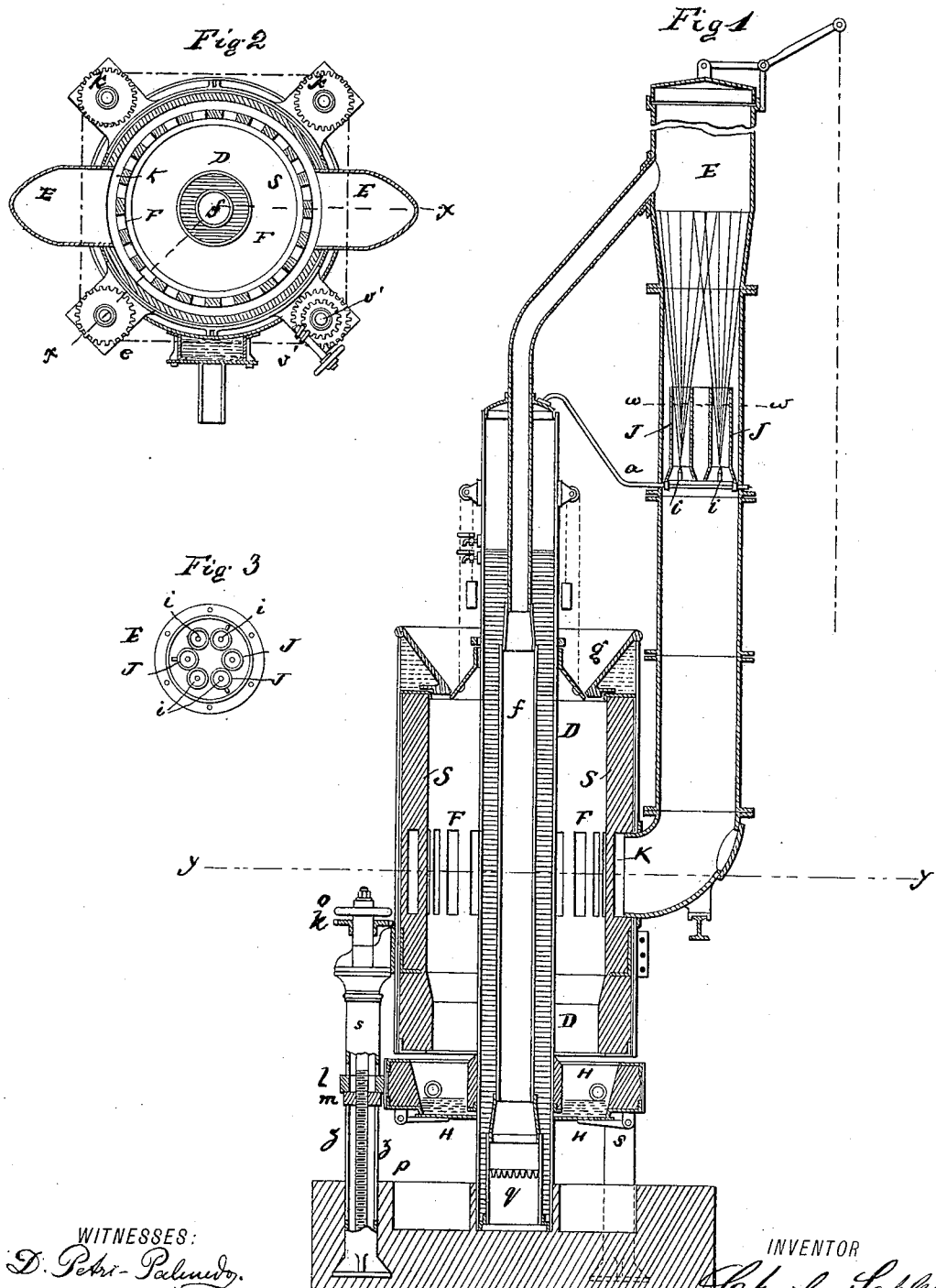

CHARLES SAHLER, OF COLOGNE, PRUSSIA, GERMANY, ASSIGNOR TO FRIEDRICH AUGUST HERBERTZ, OF SAME PLACE.

CUPOLA SMELTING-FURNACE.

SPECIFICATION forming part of Letters Patent No. 371,367, dated October 11, 1887.

Application filed December 15, 1886. Serial No. 221,605. (No model.) Patented in England November 23, 1886, No. 15,270.

*To all whom it may concern:*

Be it known that I, CHARLES SAHLER, a subject of the King of Prussia, Emperor of Germany, residing at the city of Cologne, in the Kingdom of Prussia, Empire of Germany, have invented certain new and useful Improvements in Cupola Smelting-Furnaces, (which heretofore has been patented to me by the Government of England by Letters Patent No. 15,270, dated November 23, 1886,) of which the following is a specification.

This invention relates to certain new and useful improvements in furnaces used for smelting and reducing ores; and the object of my invention is to provide a furnace in which some of the spent heat can be utilized for producing a draft; and the further object is to provided a furnace for smelting in which all parts of the metal are reduced uniformly.

A further object of my invention is to facilitate the adjusting of the hearth.

The invention consists in the combination, with a shaft and hearth, of a cylindrical vessel containing water passed centrally through the shaft and hearth, which vessel may be used for generating steam to be used for creating the draft.

The invention also consists of the construction and combination of parts and details, as will be fully described and set forth hereinafter, and finally pointed out in the claims.

In the accompanying drawings, Figure 1 is a cross sectional elevation of my improved smelting-furnace on the line *x x x*, Fig. 2. Fig. 2 is a plan view of the same on the line *y y*, Fig. 1. Fig. 3 is a sectional plan view of the draft-pipe on the line *w w*, Fig. 1.

Similar letters of reference indicate corresponding parts.

The shaft S is constructed and lined in the usual manner and suitably supported. Below the same I provide the hearth H, which is provided with corner-lugs, *l*, resting on nuts *m*, mounted to slide vertically in columns *s*, having longitudinal slots *z z* for guiding said nuts. Screw-spindles *p* are passed longitudinally through apertures in the lugs and through the nuts, said screw-spindles passing through the standards *s*. At the upper end said spindles have the hand-wheels *o*, and directly below the hand-wheels each screw-spindle is provided with a toothed wheel, *k*, and over the several wheels an endless chain, *e*, passes, which engages with the teeth of said wheels. One of the spindles is provided with a worm-wheel, *v'*, with which a worm, *v*, engages, said worm being mounted on a shaft provided with a suitable hand-wheel, as shown in Fig. 2. By turning said shaft provided with the worm all the spindles are turned simultaneously, and thereby the nuts *m* moved upward or downward, whereby the hearth is raised or lowered, and the draft-opening between the bottom of the shaft and the top of the hearth is increased or decreased.

The shaft has suitable brackets for supporting it on the standards or columns *s*. A cylindrical vessel, D, extends up through the hearth and shaft, and in the bottom of the same a furnace, *q*, is provided, from which furnace a flue, *f*, extends upward through the cylindrical vessel D, and has its upper end above the top of the cylindrical vessel connected with the suction-pipe E, provided at its top with a suitable damper, and having its lower end connected with an annular chamber, K, in the shaft, which annular chamber is in connection with the interior of the shaft by a series of vertical slots, F, arranged in a circle.

I have only shown one suction-pipe in Fig. 1, but two in Fig. 2, both being connected with the annular chamber, K. The gate *g* for closing the top of the shaft is provided with a central aperture, through which the cylindrical vessel D can pass. So that the hearth and said gate *g* can slide on the cylindrical vessel D, the rivets on the outer side of the same must be countersunk so as to present no obstruction. The said vessel D is provided above the shaft with suitable water cocks, gages, &c. The vessel D is preferably constructed as a steam-boiler, and from its top a pipe, *a*, leads into the suction-tube E, on which pipe *a* one or more injector-tubes, J, are fixed, into which the nozzles *i* on the pipe *a* project.

The smelting or converting process does not take place as uniformly in the center of the shaft as it does near the sides, and for that reason I have provided the cylindrical vessel D, which is preferably used as a steam-boiler, thereby consuming the spent heat in the middle of the furnace. The steam generated is used to create a suction in the furnace when a powerful draft is required. In case there is sufficient steam at the works, and there is no need of generating steam in the furnace, the vessel D may be used as a water-heating vessel, or may be provided for occupying the center of the shaft, where the smelting does not take place perfectly.

The fire-place $q$, at the bottom of the vessel or boiler, is provided so as to generate steam in said boiler by means of a separate fire for the purpose of creating a draft when the furnace proper is fired.

I am aware that it is not broadly new to construct a furnace with a vertical water-tube in the center of the same, and do not claim this, broadly.

Having thus described my invention, I claim as new and desire to secure by Letters Patent—

1. The combination, with a furnace-shaft, of a vertically-adjustable hearth, a vertical boiler passing centrally through said shaft and hearth, a furnace at the lower part of said boiler below the hearth, a smoke-flue passing centrally through said boiler, an annular chamber in the shaft communicating by slots with the interior of the same, a suction-pipe connected to said chamber and to the smoke-flue, and an ejector located within said suction-pipe and connected with the steam-boiler, substantially as set forth.

2. The combination, with a furnace having a vertically-adjustable hearth, of a vertical boiler located centrally in the furnace and passing through an aperture in the cover, which is mounted to slide on the outside of the said boiler, and the usual fire-box, substantially as shown and described.

3. The combination, with a tubular upright furnace, of a hearth having lugs, nuts mounted to slide in standards provided with slots, through which slots the lugs pass and rest on the nuts, screw spindles on the standards in which the nuts are mounted, toothed wheels on the upper ends of the spindles, an endless chain passed over the toothed wheels, a worm-wheel on one of the spindles, and a worm engaged with said worm-wheel, substantially as shown and described.

In testimony whereof I have signed my name to this specification in the presence of two subscribing witnesses.

CHARLES SAHLER.

Witnesses:
F. A. HERBERTZ,
GUSTAVE ALBERT OELRICHS.